3,823,127
NUTRITIONAL IRON-PROTEIN COMPLEXES FROM WASTE EFFLUENTS

Susan B. Jones, Philadelphia, Edwin B. Kalan, Abington, Thomas C. Jones, Philadelphia, and Frederic Hazel, Havertown, Pa., assignors to the United States of America as represented by the Secretary of Agriculture
No Drawing. Filed June 7, 1972, Ser. No. 260,572
Int. Cl. A23c 21/00; A23j 1/00
U.S. Cl. 260—112 R  3 Claims

ABSTRACT OF THE DISCLOSURE

Proteins are precipitated and recovered from industrial waste effluents such as whey by addition of Ferripolyphosphate to the effluents. The recovered product, a Ferripolyphosphate-protein complex in powder form containing from 8 to 15% iron and from 15 to 50% protein is highly nutritional and highly assimilable and has great potential as an iron-protein enriching additive in food and other products.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to the preparation of Ferripolyphosphate-protein complexes from protein containing liquids and more particularly to the preparation of such complexes for use as iron and protein-enriching food additives.

Although precipitation of proteins at acid pH by the polyphosphate anion (U.S. Pat. 2,377,624) and by heavy metal cations, including Fe(III) (U.S. Pat. 2,710,858) is well known, the present invention is a novel and important discovery especially as an aid in solving both nutritional and ecological problems. It has an especially high potential usefulness in the removal of proteinaceous solids from industrial waste effluents and could relieve a great deal of the burden on municipal and other waste disposal operations caused by such solids. Furthermore, the Ferripolyphosphate-protein complexes obtained from various sources of protein containing liquids are highly nutritional as iron and protein enriching food additives.

It is an object of this invention to provide a process for preparing nutritionally valuable iron-protein complexes from waste effluent and other liquid protein-containing sources.

Another object of this invention is to provide a method of precipitating proteins from factory and other waste effluents.

A further object is to provide a means of reducing pollution in streams by removing proteinaceous materials from liquid industrial and municipal sewage and waste.

A still further object is to prepare Ferripolyphosphate-protein complexes in powder form for use as iron and protein-enriching food additives.

In general, according to this invention Ferripolyphosphate-protein complexes in powder form are prepared by adding Ferripolyphosphate to protein containing liquids such as whey and potato waste preferably at pH range of about 3.2 to 4.0 and then recovering and drying the precipitated iron-protein complex. The complexes are white, fluffy, mild tasting and uniform in texture and contain from 8 to 15% and from 15 to 50% protein.

In feeding tests the Ferripolyphosphate-protein complexes proved to have high assimilability, relative to ferrous sulfate, when fed to rats and chicks. In fact, the complexes were found to be 93% as effective as ferrous sulfate in restoring the hemoglobin levels of iron-depleted rats. Also, the assimilability of the iron in the complex was not adversely affected when milk to which the complex had been added was processed into a sterile concentrate.

The complexes also performed very acceptably in bread-baking tests as measured by loaf volume and crumb structure and did not alter the color of the bread.

In view of the fact that many other iron compounds are relatively unavailable for animal and human nutrition and are not stable to industrial food processing techniques, the process and products of this invention are timely and important contributions to food and food processing technology.

Ferripolyphosphate is a soluble complex of ferric ions with a long chain polyphosphate and was prepared generally as described by Hazel et al., U.S. Pat. 3,403,971, by mixing solutions of ferric chloride and glassy sodium polyphosphate (unadjusted, powdered Calgon).

Three forms of Ferripolyphosphates were prepared which differed from each other in their relative proportions of ion and phosphate. These forms were a sparingly soluble gel, a liqiud system 0.25 M in iron and 1.5 M in $PO_3$ groups, and a liquid system 0.167 M in iron and 2 M in $PO_3$ groups. Combining one volume 0.5 M ferric chloride with one-half volume of an unadjusted Calgon solution which was 3 M in $PO_3$ groups produced a gel with an Fe/P mole ratio of approximately 1/3. Although poorly soluble in water, the gel dissolved readily in excess sodium polyphosphate solution. Thus a liquid system at pH of approximately 1.2 with an Fe/P mole ratio of approximately 1/6 was produced by mixing equal volumes of the above ferric chloride and the above Calgon solution. The liquid complex system, 0.25 M in iron was clear and light orange in color. After standing at 25° C. for about three days, or at 4° C. for about a week, a large amount of white precipitate accumulated. The liquid remaining was pink in color and was an effective protein precipitant.

Mixing one volume 0.5 M ferric chloride with two volumes 3 M Calgon produced a liquid system at approximately pH 2.2 with an Fe/P mole ratio of approximately 1/12 (0.167 M in Fe and 2 M in $PO_3$ groups). After standing at room temperatures for about four days, the initial pale orange color changed to pink.

For the purposes of demonstrating the usefulness of this invention, the Ferripolyphosphate soluble complex of mole ratio 1/12 and acid whey from the production of cottage cheese were used. The whey contained relatively large amounts of calcium chloride and a low protein level of about 0.2 to 0.3% w./v.

Sufficient Ferripolyphosphate was added at room temperature to whey at pH 4.6 to bring the concentration of iron to a desired level. For each liter of whey, 250 ml. of mole ratio 1/12 Ferripolyphosphate was added to give an iron concentration of .0334 M or 1.87 g./liter. A white floc was generated with the addition of even small amounts of Ferripolyphosphate. The acidity of the system after addition of the Ferripolyphosphate was usually about pH 3.5–3.8; otherwise it was adjusted to that pH range. Although this pH range was preferable, it was not critical to obtain satisfactory powders. In four to six hours the precipitate settled sufficiently so that the supernatant liquid could be siphoned from the vessel. The remaining liquid was removed by centrifugation. The precipitate was washed with distilled water, dialyzed exhaustively against distilled water at 4° C., and lyophilized.

Iron analyses were performed by atomic absorption spectrophotometry, phosphorus analyses by the method of Meun et al (Anal. Biochem. 26, 364, 1968), and nitrogen determinations by the Kjeldahl method, using a conversion factor of 6.25. Zone electrophoresis of Ferripolyphosphate-protein powders (FIP-protein powders) was performed in 8% polyacrylamide gel in pH 9.2 TRIS (trihydroxymethylaminomethane) buffer, with and without 4.5 M urea (Peterson, J. Dairy Sci., 46, 1136, 1963). The proteins were visualized by amido black dye.

From 10 liters of commercial whey plus 2.5 liters "Ferripolyphosphate" (mole ratio 1/12) the yield was 110–120 g. FIP-protein powder. From a number of runs typical powders contained from 15 to 50% protein, 8 to 15% iron, 30 to 50% $P_2O_5$ and 2 to 5% calcium depending on the type of whey. The product was insoluble, but easily dispersible, in water and soluble in dilute base.

A comparison of FIP-protein powders prepared with Ferripolyphosphate complexes of different concentrations, each eight weeks old is shown in Table I. The complex having Fe/P mole ratio equal to 1/6 produced the greater quantity of precipitate containing higher levels of iron and protein.

In addition to discovering that Ferripolyphosphate can be used to precipitate and recover proteins from waste and other fluids, we also discovered that the Ferripolyphosphate has to be aged about 2 weeks before it is a satisfactory precipitant. Freshly made Ferripolyphosphate is a relatively poor precipitant. A comparison of protein powders prepared from fresh and aged Ferripolyphosphates is shown in Table II.

Increasing amounts of Ferripolyphosphate, mole ratio 1/12, aged 5 weeks were added to whey having a protein content of 250 mg. per 100 ml. Of the protein present in the whey, about 31, 42, 50, 69 and 99% of it was precipitated by the addition of 3, 5, 10, 20 and 43 ml., respectively of the Ferripolyphosphate.

Ferripolyphosphate has been shown to be a useful reagent for the recovery of highly nutritious proteins from a heretofore industrial waste effluent, whey. The proteins are obtained in a form containing 12–15% iron, which is a considerable upgrading of the nutritional value of the proteins and can serve as important iron-enriching additives to dairy products and other commonly used food such as flour, cereals, and potato flakes. In light of recent nutritional surveys indicating insufficient iron in the diets of many segments of the population, the discovery which this invention embodies is an important contribution to both the nutritional and ecological sciences.

TABLE I

Comparison of FIP-protein powders prepared from ferripolyphosphates of different Fe/P mole ratios

| Mole ratio | 1/6 | 1/12 |
|---|---|---|
| Yield, from 50 ml. whey, mg | 600.0 | 459.0 |
| Fe, percent | 16.4 | 10.0 |
| $P_2O_5$, percent | 48.5 | 44.4 |
| Protein, percent | 19.9 | 17.1 |
| Protein, mg | 119.0 | 78.5 |

TABLE II

Comparison of FIP-protein powders prepared from ferripolyphosphates aged for different time periods [1]

| Aging time | 24 hours | 8 weeks |
|---|---|---|
| Yield, from 50 ml. whey, mg | 186.0 | 600.0 |
| Fe, percent | .87 | 16.4 |
| $P_2O_5$, percent | 31.4 | 48.5 |
| Protein, percent | 45.1 | 19.9 |
| Protein, mg | 83.9 | 119.0 |

[1] Fe/P mole ratio of 1/6 aged 8 weeks prior to use.

We claim:

1. A process for preparing a Ferripolyphosphate-protein complex from industrial and other protein containing waste effluents comprising adding to said effluents a sufficient amount of Ferripolyphosphate in liquid media to precipitate and form with the protein in the effluent a Ferripolyphosphate-protein complex, separating the complex from the supernatant effluent, and drying the separated complex to powder form, said complex containing from 8 to 15% iron and from 15 to 50% protein and being highly assimilable and highly nutritional, said Ferripolyphosphate having been prepared by mixing aqueous solutions of ferric chloride and glassy sodium polyphosphate in proportions to obtain an Fe/P mole ratio of about from 1:6 to about 1:12, ageing the Ferripolyphosphate for at least about 14 days during, which time a precipitate may form, and then separating the Ferripolyphosphate in liquid media from any formed precipitate.

2. The process of Claim 1 wherein the industrial waste effluent is whey.

3. A process for removing proteinaceous matter from waste effluents carried by industrial and municipal waste disposal systems containing such matter comprising adding to said effluents a sufficient amount of ferripolyphosphate in liquid media to precipitate and form with the proteinaceous matter in the effluent a Ferripolyphosphate-protein complex and then separating the liquid effluent from the complex, said Ferripolyphosphate having been prepared by mixing aqueous solutions of ferric chloride and glassy sodium polyphosphate in proportions to obtain a Fe/P mole ratio of about from 1:6 to about 1:12, ageing the Ferripolyphosphate for at least about 14 days during which time a precipitate may form, and then separating the Ferripolyphosphate in liquid media from any formed precipitate.

References Cited

UNITED STATES PATENTS

| 1,072,989 | 9/1913 | Preiswerk | 260—115 |
| 2,377,624 | 6/1945 | Gordon | 260—112 R |
| 2,710,858 | 6/1955 | Block et al. | 260—115 X |
| 2,754,292 | 7/1956 | Henderson et al. | 260—115 |
| 2,826,571 | 3/1958 | Henika et al. | 260—115 |
| 3,074,423 | 12/1962 | Alexander et al. | 423—311 |
| 3,403,971 | 10/1968 | Hazel et al. | 423—311 |
| 3,563,761 | 2/1971 | Ellinger | 99—57 |
| 3,615,661 | 10/1971 | Ellinger et al. | 99—57 |

JOSEPH M. GOLIAN, Primary Examiner

U.S. Cl. X.R.

426—356, 364, 23, 212; 210—42; 260—115